(12) United States Patent
Adachi et al.

(10) Patent No.: US 11,425,274 B2
(45) Date of Patent: Aug. 23, 2022

(54) SHEET TRANSPORT DEVICE, IMAGE READING DEVICE, AND IMAGE FORMING APPARATUS

(71) Applicant: FUJIFILM Business Innovation Corp., Tokyo (JP)

(72) Inventors: Isamu Adachi, Kanagawa (JP); Takakiyo Toba, Kanagawa (JP); Yosuke Takahashi, Kanagawa (JP); Masato Serikawa, Kanagawa (JP); Yuta Abe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 383 days.

(21) Appl. No.: 16/541,175

(22) Filed: Aug. 15, 2019

(65) Prior Publication Data

US 2020/0304667 A1 Sep. 24, 2020

(30) Foreign Application Priority Data

Mar. 18, 2019 (JP) .............................. JP2019-049724

(51) Int. Cl.
| | |
|---|---|
| *H04N 1/08* | (2006.01) |
| *H04N 1/00* | (2006.01) |
| *G03G 15/00* | (2006.01) |
| *B65H 7/02* | (2006.01) |
| *B65H 5/06* | (2006.01) |

(52) U.S. Cl.
CPC ......... *H04N 1/00602* (2013.01); *B65H 5/062* (2013.01); *B65H 7/02* (2013.01); *G03G 15/6529* (2013.01); *H04N 1/0066* (2013.01); *H04N 1/00708* (2013.01); *H04N 1/00779* (2013.01)

(58) Field of Classification Search
CPC ............. H04N 1/00602; H04N 1/0066; H04N 1/00708
See application file for complete search history.

(56) References Cited

U.S. PATENT DOCUMENTS

2001/0031155 A1* 10/2001 Hashimoto ........ G03G 15/6552
399/130
2018/0376020 A1* 12/2018 Shiota .................... G03G 15/70

FOREIGN PATENT DOCUMENTS

JP 2007070098 3/2007

* cited by examiner

*Primary Examiner* — Ibrahim Siddo
(74) *Attorney, Agent, or Firm* — JCIPRNET

(57) ABSTRACT

A sheet transport device includes a sheet transport unit, a detector, and a releasing unit. The sheet transport unit transports a sheet by nipping the sheet in a nip between multiple pairs of transport rollers arranged in a sheet width direction intersecting a sheet transport direction. The detector detects a size of the transported sheet. The releasing unit releases the nip of one or more of the pairs of transport rollers outside a transport region of the sheet based on the size of the sheet detected by the detector.

10 Claims, 12 Drawing Sheets

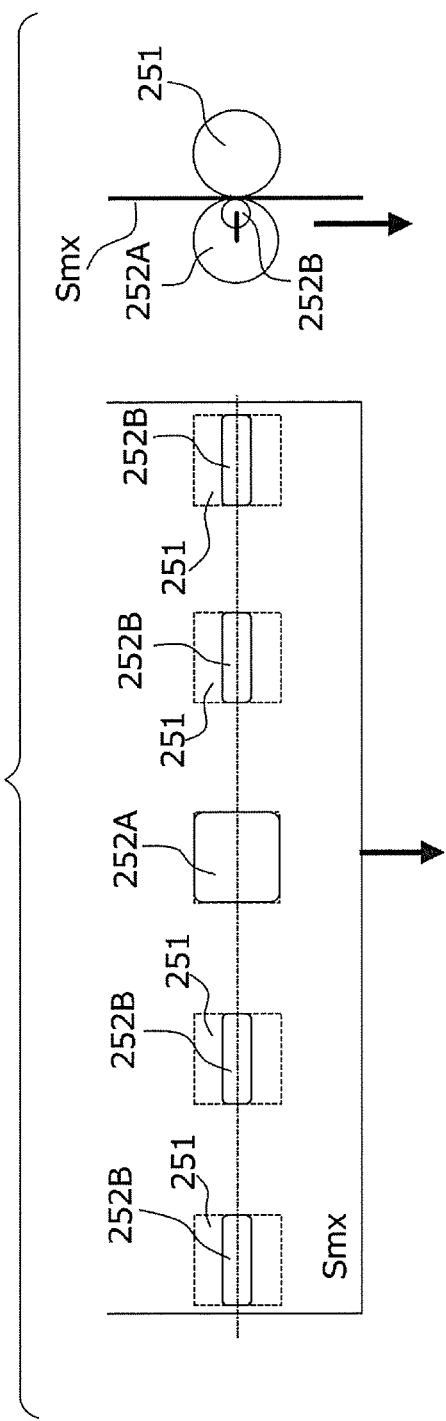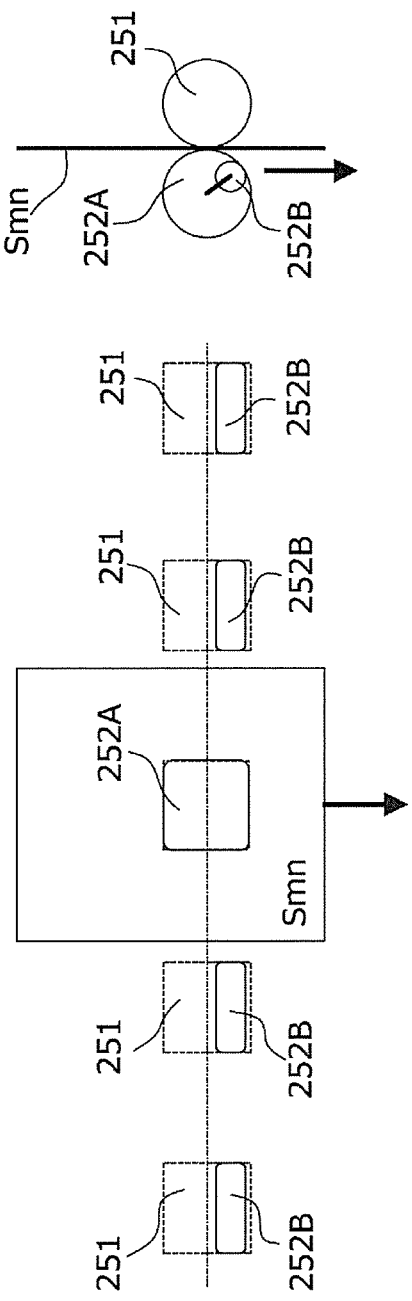

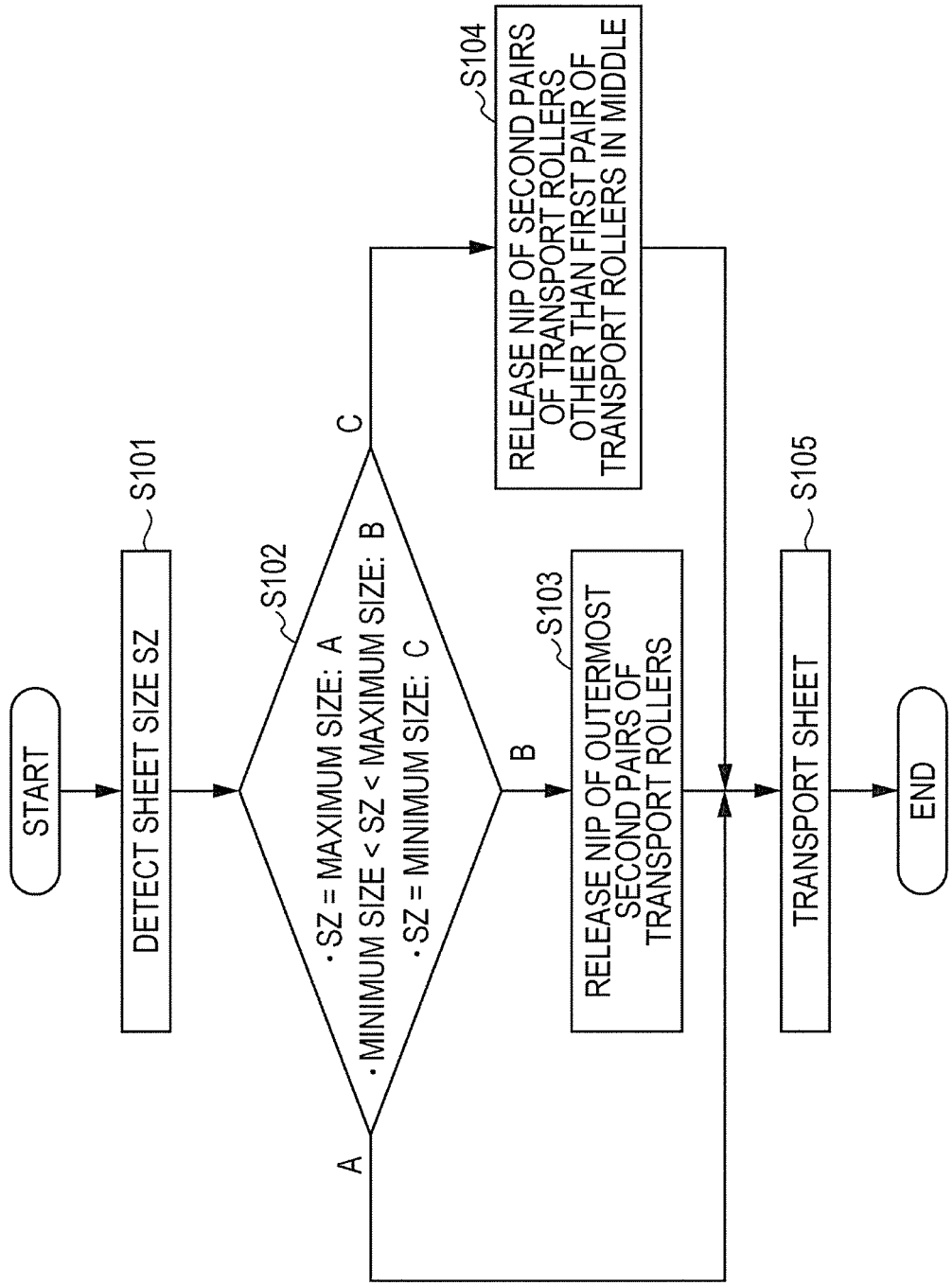

SHEET TRANSPORT DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2019-049724 filed Mar. 18, 2019.

BACKGROUND

(i) Technical Field

The present disclosure relates to sheet transport devices, image reading devices, and image forming apparatuses.

(ii) Related Art

Japanese Unexamined Patent Application Publication No. 2007-70098 discloses a known thin-object transport device including a rotatable driving member and multiple driven members that come into pressure contact with the driving member. The driven members each include an elastic member for producing pressure in a contact area where the driven member comes into contact with the driving member. In this thin-object transport device, the positions where the elastic members are attached to the multiple driven members vary, and the driving members and the driven members produce pressure that allows for straight transporting of the thin object without skewing.

SUMMARY

Aspects of non-limiting embodiments of the present disclosure relate to a sheet transport device, an image reading device, and an image forming apparatus that are capable of suppressing a decrease in the transporting force of a small-size sheet to be transported, as compared with a configuration that does not release the nip of pairs of transport rollers outside a sheet transport region.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet transport device including a sheet transport unit, a detector, and a releasing unit. The sheet transport unit transports a sheet by nipping the sheet in a nip between multiple pairs of transport rollers arranged in a sheet width direction intersecting a sheet transport direction. The detector detects a size of the transported sheet. The releasing unit releases the nip of one or more of the pairs of transport rollers outside a transport region of the sheet based on the size of the sheet detected by the detector.

BRIEF DESCRIPTION OF THE DRAWINGS

Exemplary embodiments of the present disclosure will be described in detail based on the following figures, wherein:

FIGS. 7A and 7B are plan views schematically illustrating how a sheet is transported by the takeaway roller;

FIG. 11 is a flowchart illustrating the flow of a sheet transport process of the takeaway roller according to the modification.

DETAILED DESCRIPTION

The present disclosure will be described in further detail below with reference to exemplary embodiments and specific examples. However, the present disclosure is not to be limited to these exemplary embodiments and specific examples.

Furthermore, in the following description with reference to the drawings, it should be noted that the drawings are schematic and that the dimensional ratios are different from the actual dimensional ratios. For providing an easier understanding, components other than those necessary for the description are omitted, where necessary.

1. Overall Configuration and Operation of Image Forming Apparatus

Figure 1:
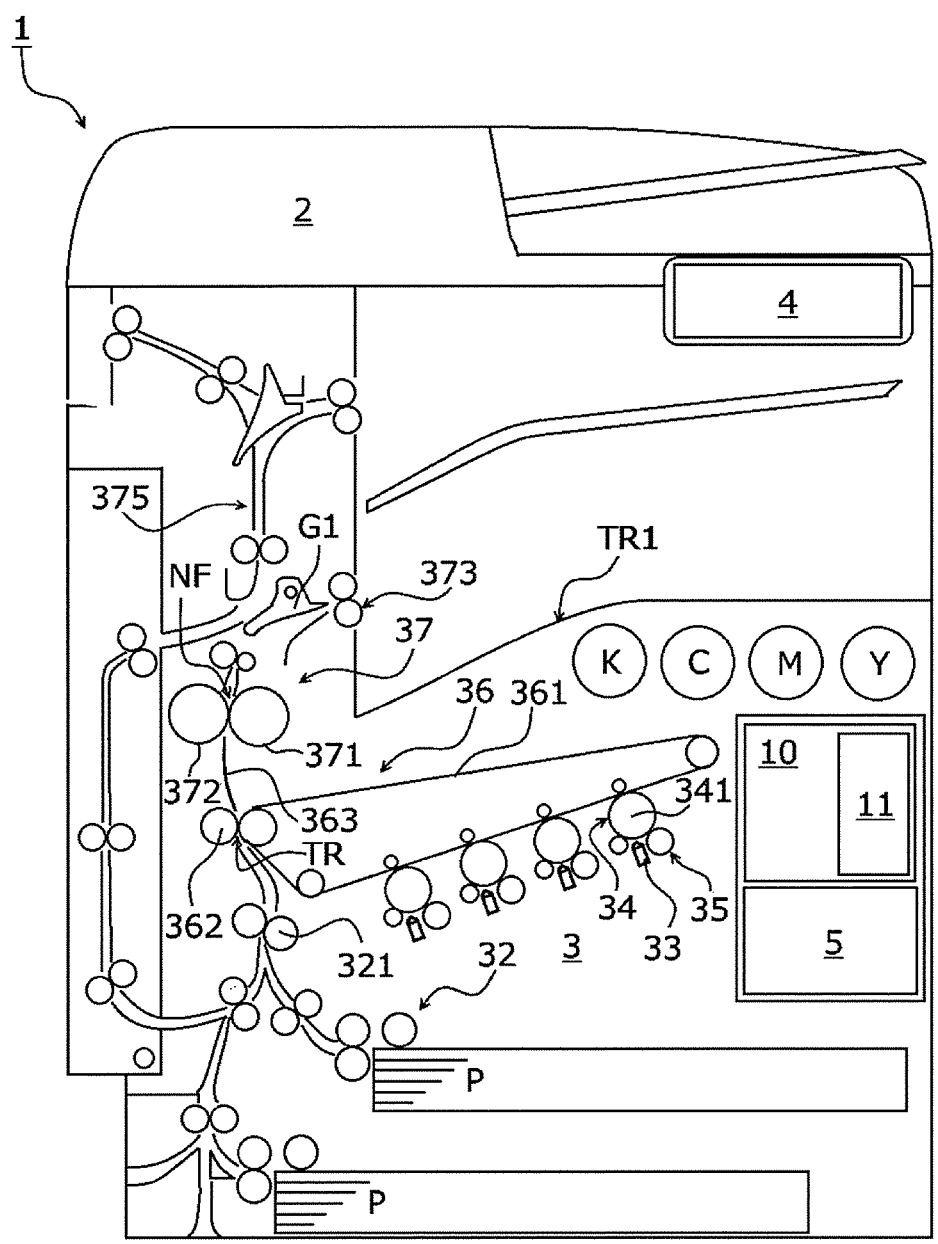
FIG. 1 is a cross-sectional view schematically illustrating the internal configuration of an image forming apparatus.
Figure 2:
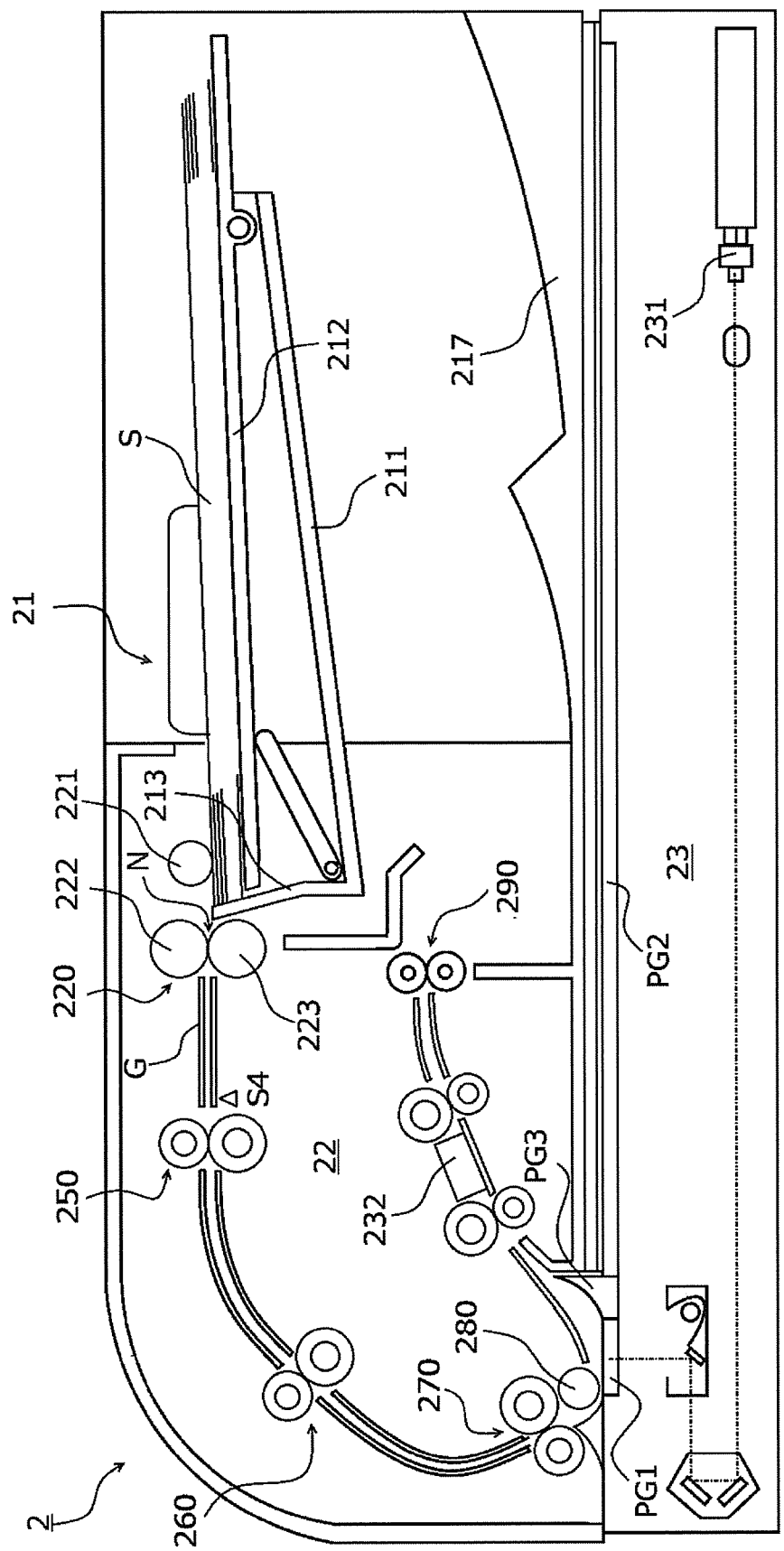
FIG. 2 is a cross-sectional view illustrating the internal configuration of an image reading device.
Figure 3:
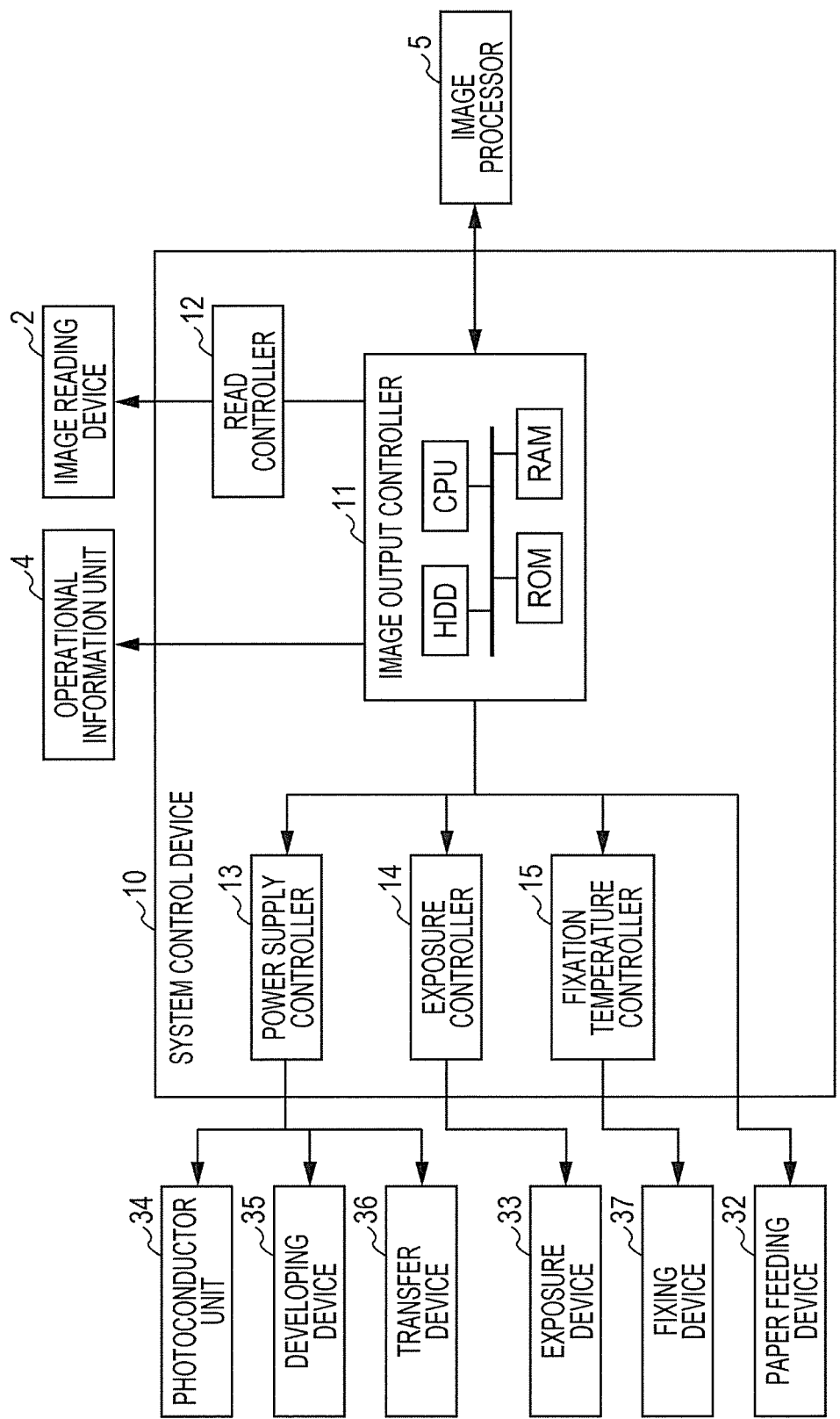
FIG. 3 is a block diagram illustrating an example of a functional configuration of the image forming apparatus.
Figure 4:
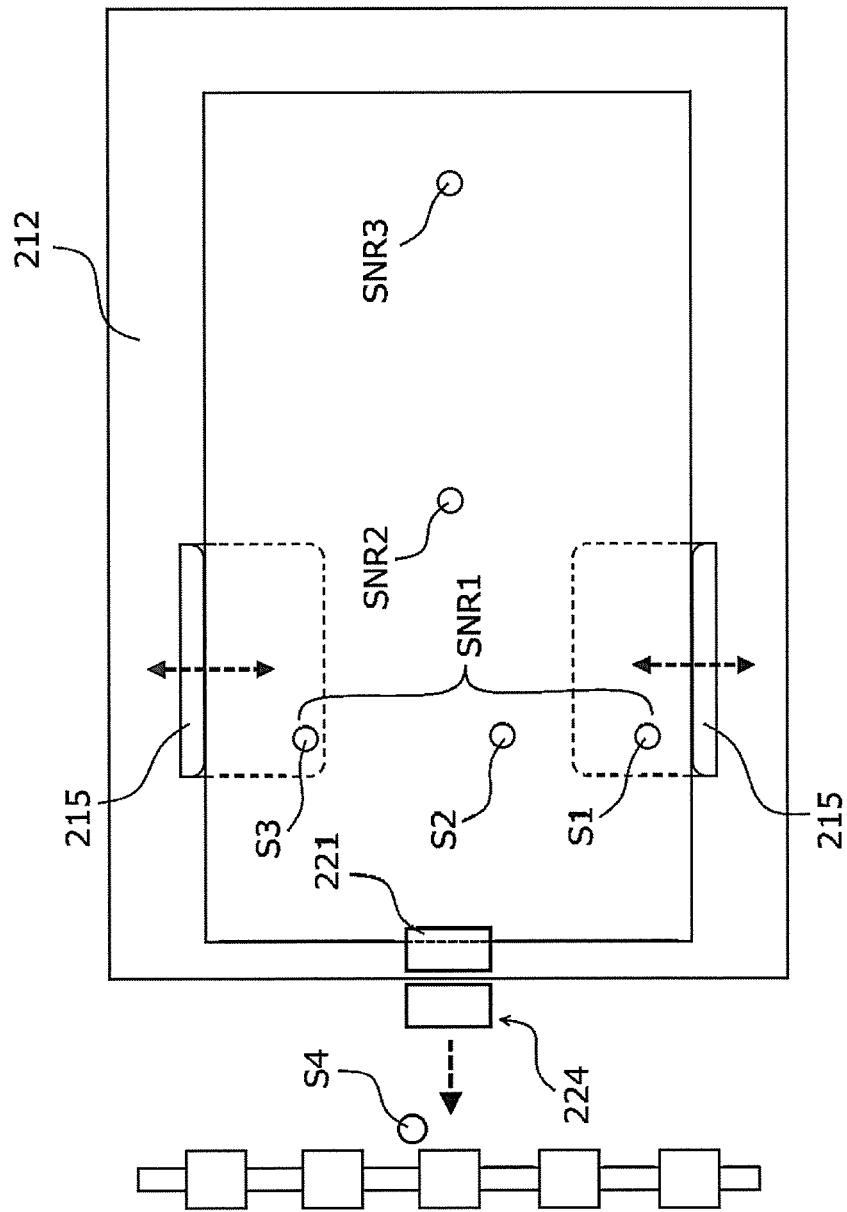
FIG. 4 is a plan view schematically illustrating the arrangement of sheet detection sensors in a sheet load section.

FIG. 1 is a cross-sectional view schematically illustrating the internal configuration of an image forming apparatus 1 according to an exemplary embodiment. FIG. 2 is a cross-sectional view illustrating the internal configuration of an image reading device 2. FIG. 3 is a block diagram illustrating an example of a functional configuration of the image forming apparatus 1. FIG. 4 is a plan view schematically illustrating the arrangement of sheet detection sensors in a sheet load section 21. The overall configuration and the operation of the image forming apparatus 1 will be described below with reference to the drawings.

1.1. Overall Configuration

The image forming apparatus 1 includes an image reading device 2 that reads an image from a sheet S, such as a document, and converts it into image data, an image forming unit 3 as an image recorder that prints the read image data onto paper as a recording medium, an operational information unit 4 as a user interface, and an image processor 5.

The image reading device 2 includes a sheet load section 21, an automatic sheet feeder 22, and an image reader 23 as an example of an imaging unit. The automatic sheet feeder 22 transports the sheet S placed on the sheet load section 21 to a read position of the image reader 23. An image read by an image sensor (not shown), such as a charge-coupled device (CCD) line sensor, of the image reader 23 is converted into image data as an electric signal.

The image forming unit 3 includes a paper feeding device 32, exposure devices 33, photoconductor units 34, developing devices 35, a transfer device 36, and a fixing device 37, and forms image information received from the image processor 5 as a toner image onto paper P fed from the paper feeding device 32.

The operational information unit 4 as a user interface is disposed on the front surface of the image reading device 2. The operational information unit 4 is constituted of a combination of, for example, a liquid crystal display panel, various control buttons, and a touchscreen. A user of the image forming apparatus 1 may input various settings and a command via the operational information unit 4 as an example of a receiving unit. Moreover, various types of information are displayed to the user of the image forming apparatus 1 via the liquid crystal display panel.

The image processor 5 generates image data from the image read by the image reading device 2 and from print information transmitted from an external apparatus (such as a personal computer).

1.2. Image Forming Unit

Paper P designated in a print job for each printing process is fed from the paper feeding device 32 to the image forming unit 3 in accordance with an image formation timing of the image forming unit 3.

The photoconductor units 34 individually include photoconductor drums 341 that are provided parallel to one another above the paper feeding device 32 and that are rotationally driven. The developing devices 35 form yellow (Y), magenta (M), cyan (C), and black (K) toner images on the corresponding photoconductor drums 341 having electrostatic latent images formed thereon by the exposure devices 33.

The toner images formed on the photoconductor drums 341 of the respective photoconductor units 34 are sequentially electrostatically transferred (first-transferred) onto an intermediate transfer belt 361 of the transfer device 36, so that a superposed toner image constituted of toners of the respective colors is formed. The superposed toner image on the intermediate transfer belt 361 is collectively transferred by a second-transfer roller 362 onto the paper P transported from a pair of registration rollers 321 and guided by a transport guide.

In the fixing device 37, a fixation nip FN (fixation region) is formed by a pressure contact area of a pair of heating module 371 and pressing module 372.

The paper P having the toner image collectively transferred thereon by the transfer device 36 is transported to the fixation nip FN of the fixing device 37 via a transport guide 363 in a state where the toner image is not fixed on the paper P yet. Then, the pair of heating module 371 and pressing module 372 fixes the toner image onto the paper P in accordance with heating and pressing functions.

The paper P having the fixed toner image formed thereon is guided to a switch gate G1 and is output from a first pair of output rollers 373 so as to be accommodated in a paper output tray TR1 at the upper surface of the image forming apparatus 1. If the paper P is to be inverted for duplex printing or is to be output with the image recorded face thereof facing upward, the transport direction of the paper P is switched toward a transport path 375 by the switch gate G1.

1.3. Image Reading Device

The image reading device 2 includes the sheet load section 21, the automatic sheet feeder 22, and the image reader 23. The sheet load section 21 and the automatic sheet feeder 22 are connected to each other in an openable and closable manner above the image reader 23.

The sheet load section 21 includes a sheet tray 212 on which one or more sheets S having images recorded thereon are placed. The sheet tray 212 is ascendable and descendible in accordance with the number of placed sheets S and retains the sheets S at an ascent position where the upper surface of the sheets S is in contact with a nudger roller 221.

As shown in FIG. 4, the sheet load section 21 includes a sheet-width detection sensor SNR1 as an example of a detector that detects the sheet width of a sheet S placed on the sheet tray 212. The sheet-width detection sensor SNR1 includes three optical sensors S1, S2, and S3 arranged along an actuator (not shown) that moves together with side guides 215 with sliding movement of the side guides 215. The positional relationships between the actuator and the optical sensors S1, S2, and S3 are set such that the on-off modes of the three optical sensors S1, S2, and S3 are switched based on, for example, eight patterns in accordance with the positions of the side guides 215.

As shown in FIG. 4, the sheet load section 21 is provided with a first sheet-length detection sensor SNR2 and a second sheet-length detection sensor SNR3 that detect the sheet length of the sheet S placed on the sheet tray 212. The first sheet-length detection sensor SNR2 and the second sheet-length detection sensor SNR3 are arranged on the sheet tray 212 in the transport direction of the sheet S and detect the sheet length of the sheet S placed on the sheet tray 212.

The automatic sheet feeder 22 includes the nudger roller 221 that fetches sheets S loaded on the sheet tray 212 sequentially from the top, and also includes a separator 220 constituted of a feed roller 222 and a retardation roller 223 in pressure contact with the feed roller 222.

In the separator 220, the feed roller 222 and the retardation roller 223 form a pair that separates sheets S from each other, if multiple stacked sheets S are fed to a nip N, so as to transport the sheets S one-by-one to the image reader 23.

In a sheet transport path G, a takeaway roller 250 as an example of a sheet transport unit constituted of driving rollers and driven rollers is disposed at a position downstream of the feed roller 222 in the transport direction of the sheet S. The takeaway roller 250 transports the sheet S fed by the feed roller 222 further downstream to a pre-registration roller 260.

As shown in FIG. 4, a feed-out sensor S4 is provided upstream of the takeaway roller 250. The feed-out sensor S4 is constituted of a reflective optical sensor and detects the leading edge of the sheet S so as to act as a trigger for forming a loop by causing the sheet S transported from the separator 220 to abut on the takeaway roller 250 in a stopped state. A feed amount corresponding to a predetermined number of pulses from when the feed-out sensor S4 switches to an on mode is set, such that a loop is formed in the sheet S.

Then, the takeaway roller 250 is rotationally driven, and the size in the feeding direction of the sheet S transported within a time period from when the trailing edge of the sheet S passes the feed-out sensor S4 to when the feed-out sensor S4 switches to an off mode is detected.

In the sheet transport path G, the pre-registration roller 260 is provided downstream of the takeaway roller 250. The pre-registration roller 260 is a pair of transport rollers as an example of a sheet transport unit constituted of a driving roller and a driven roller, and forms a loop in the sheet S by causing the leading edge of the sheet S to abut on a registration roller 270 in a stopped state.

The registration roller 270 that adjusts the transport timing of the sheet S is disposed downstream of the pre-registration roller 260. The pre-registration roller 260 corrects a skew of the sheet S by forming a loop in a state where the leading edge of the sheet S is in abutment with the registration roller 270 in a stopped state. The registration roller 270 is rotationally driven in accordance with a timing for starting a reading process. In a state where the loop of the sheet S is maintained by the takeaway roller 250 and the pre-registration roller 260, the sheet S is pressed against a sheet passing surface PG1 by a platen roller 280 so that the front face of the sheet S is read by the image reader 23.

A sheet placement surface PG2 that supports a sheet S placed thereon by an operator is disposed to the right of the sheet passing surface PG1. A sheet guide PG3 is disposed between the sheet passing surface PG1 and the sheet placement surface PG2. The sheet S passing over the sheet passing surface PG1 is guided to the sheet guide PG3 so as to be transported to a read sensor 232. The sheet S whose front face is read by the image reader 23 is output by an output roller 290 to an output section 217 provided below the sheet load section 21, while the rear face of the sheet S is read by the read sensor 232.

An image reading sensor 231 that optically reads an image of a sheet S and converts it into an electric signal is provided below the sheet placement surface PG2. Specifically, the image reading sensor 231 reads an image from a sheet S passing over the sheet passing surface PG1 or from a sheet S set on the sheet placement surface PG2. The read image is converted into image data as an electric signal.

1.4. Block Configuration of Image Forming Apparatus

The image forming apparatus 1 includes a system control device 10 including an image output controller 11, a read controller 12, a power supply controller 13, an exposure controller 14, and a fixation temperature controller 15, and executes a control program stored in a memory to control the operation of the entire image forming apparatus 1.

The image output controller 11 gives operation control commands to, for example, the paper feeding device 32, the exposure devices 33, the photoconductor units 34, the developing devices 35, the transfer device 36, and the fixing device 37 included in the image forming unit 3.

Furthermore, the image output controller 11 gives operation control commands to the power supply controller 13, the exposure controller 14, and the fixation temperature controller 15 included in the system control device 10. Specifically, the image output controller 11 determines whether or not, for example, the paper feeding device 32, the exposure devices 33, the photoconductor units 34, the developing devices 35, the transfer device 36, and the fixing device 37 constituting the image forming unit 3 are to be driven by being supplied with power, and transmits commands to the respective controllers therefor in accordance with the determination results.

Moreover, the image output controller 11 exchanges information with the read controller 12 and performs predetermined image read control if an image read command is received therefrom via the operational information unit 4.

The read controller 12 controls the operation of the image reading device 2 to read an image from each sheet S by scanning while transporting the sheet S loaded on the sheet load section 21 to the image reader 23 via the automatic sheet feeder 22, and receives the read image data. The received image data is accumulated in a storage unit (HDD).

2. Configuration and Operation of Pairs of Transport Rollers

Figure 5:
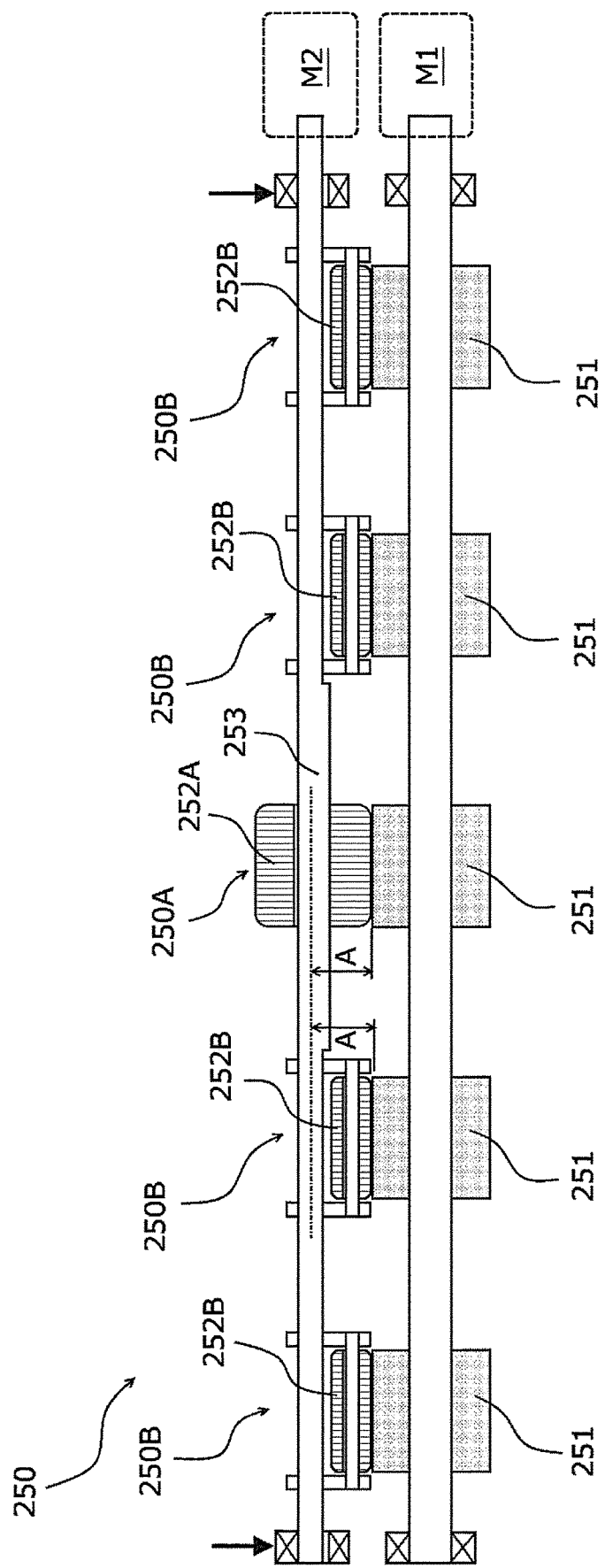
FIG. 5 is a cross-sectional view schematically illustrating the configuration of a takeaway roller in the sheet width direction.
Figure 6A:
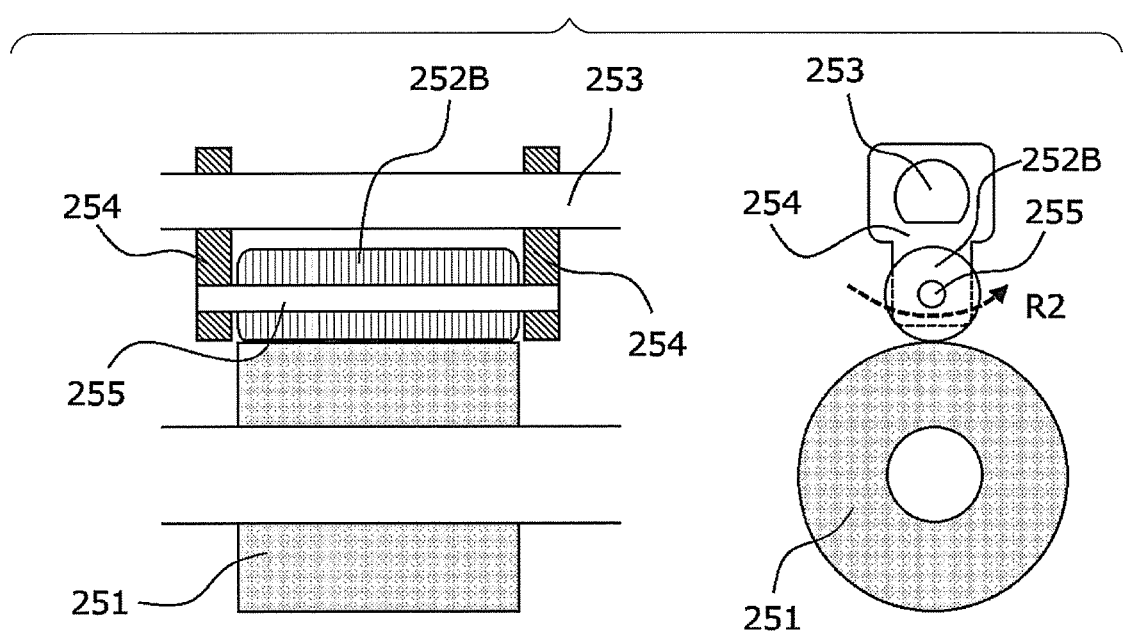
FIG. 6A is a cross-sectional view schematically illustrating a second pair of transport rollers in which a second driven roller is located at a transport position.
Figure 6B:
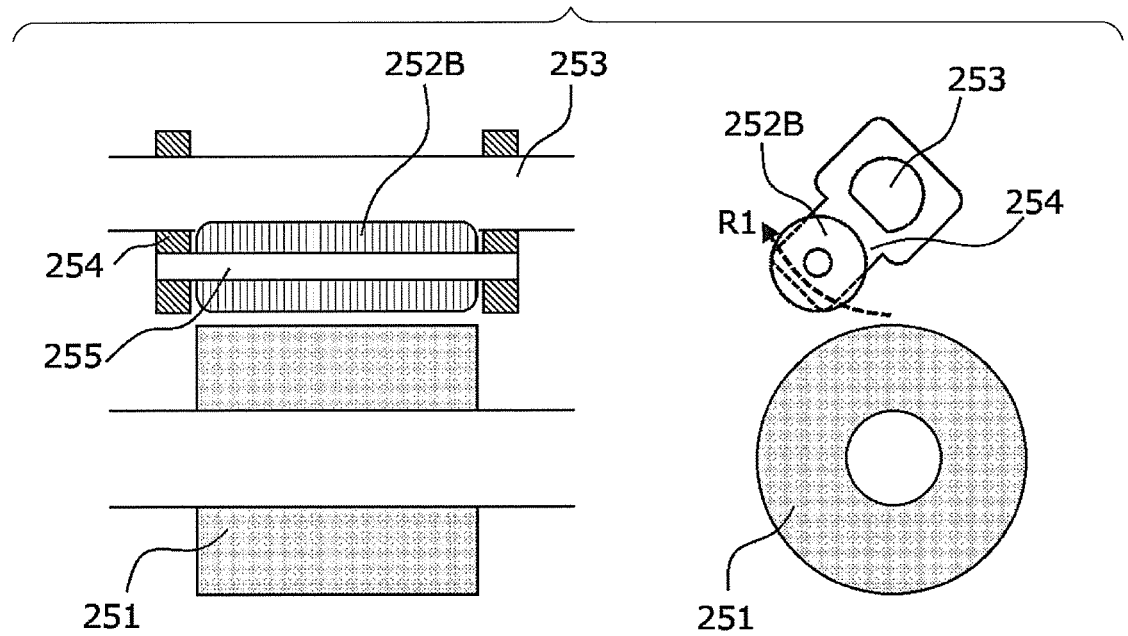
FIG. 6B is a cross-sectional view schematically illustrating the second pair of transport rollers in which the second driven roller is located at a separated position.

FIG. 5 is a cross-sectional view schematically illustrating the configuration of the takeaway roller 250 in the sheet width direction. FIG. 6A is a cross-sectional view schematically illustrating a second pair of transport rollers 250B in which a second driven roller 252B is located at a transport position. FIG. 6B is a cross-sectional view schematically illustrating the second pair of transport rollers 250B in which the second driven roller 252B is located at a separated position. FIGS. 7A and 7B are plan views schematically illustrating how a sheet is transported by the takeaway roller 250. The configuration and operation of the takeaway roller 250 will be described below with reference to the drawings.

2.1. Configuration of Pairs of Transport Rollers

The takeaway roller 250 includes driving rollers 251 rotationally driven by a driving source M1 and driven rollers 252 that form pairs of transport rollers together with the driving rollers 251 by coming into contact with the driving rollers 251 in a rotatable manner.

The driving rollers 251 are rubber rollers. In this exemplary embodiment, five driving rollers 251 are arranged in the sheet width direction in conformity with various sheet sizes of sheets S readable by the image reading device 2.

The driven rollers 252 include a first driven roller 252A that forms a first pair of transport rollers 250A together with the driving roller 251 disposed in the middle in the sheet width direction, and also include second driven rollers 252B that are disposed at the opposite sides of the first pair of transport rollers 250A in the sheet width direction and that form second pairs of transport rollers 250B together with the corresponding driving rollers 251.

The first driven roller 252A is a resinous roller having an outer diameter substantially the same as that of the driving rollers 251 and is rotatably supported by a support shaft 253.

As shown in FIGS. 6A and 6B, each second driven roller 252B is rotatably supported by a shaft 255 at second ends of arms 254 whose first ends are fixed to the support shaft 253. Each second driven roller 252B is formed such that a distance A (see reference sign A in FIG. 5) from the center of the support shaft 253 to the outer surface of the second driven roller 252B is equal to a radius A of the first driven roller 252A.

The first driven roller 252A and the second driven rollers 252B having the above-described configuration come into contact with the corresponding driving rollers 251 as a result of the support shaft 253 being pressed toward the driving rollers 251 by a pressing member (not shown), so that substantially uniform nip pressure is obtained by the first pair of transport rollers 250A and the second pairs of transport rollers 250B.

The support shaft 253 that supports the first driven roller 252A and the second driven rollers 2523 is rotatable by receiving a rotational driving force from a driving source M2. As shown in FIG. 6B, when the support shaft 253 rotates by a predetermined angle, the second driven rollers 252B rotate clockwise in FIG. 6B (see an arrow R1 in FIG. 6B) so as to move away from the driving rollers 251, whereby the nip between the second pairs of transport rollers 250B is released. Consequently, in the takeaway roller 250, only the first pair of transport rollers 250A disposed in the middle in the sheet width direction is in the nipping position.

When the support shaft 253 rotates counterclockwise (see an arrow R2 in FIG. 6A) in FIG. 6A from the state where the second driven rollers 252B are located at the separated position, the second driven rollers 252B return to the transport position to form a nip with the driving rollers 251.

2.2. Operation of Pairs of Transport Rollers and Sheet Transport Process

Figure 12A:
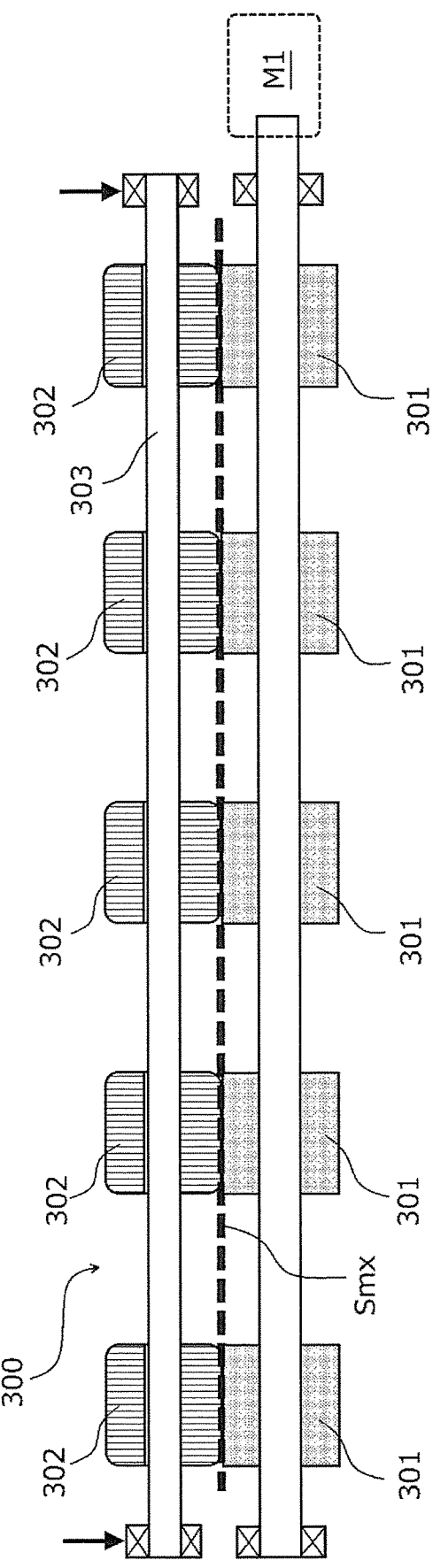
FIGS. 12A and 12B are cross-sectional views schematically illustrating how a sheet is transported by a takeaway roller according to a comparative example.
Figure 12B:
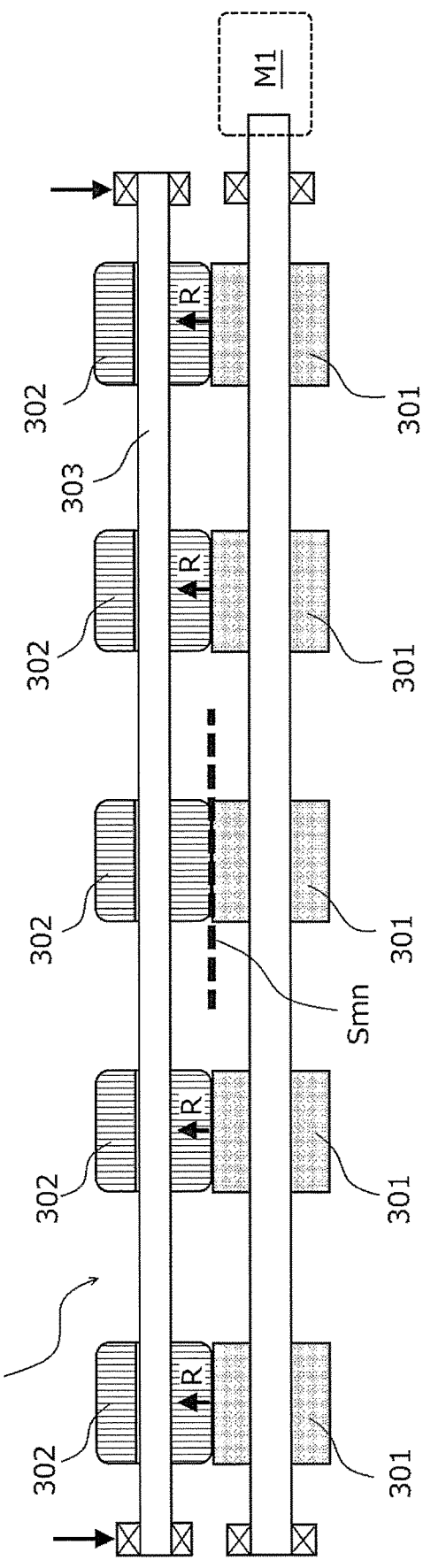

FIGS. 12A and 12B illustrate how a sheet is transported by a takeaway roller 300 according to a comparative example that includes driving rollers 301 that are rotationally driven and driven rollers 302 that are supported by a support shaft 303 and that form pairs of transport rollers together with the driving rollers 301 by coming into contact with the driving rollers 301.

As shown in FIG. 12A, if the transported sheet S is of a maximum transportable size Smx (e.g., size A3), all of the pairs of transport rollers of the takeaway roller 300 in the sheet width direction apply predetermined nip pressure to the sheet S, so that the transport orientation thereof tends to be stable.

On the other hand, as shown in FIG. 12B, if the transported sheet S is of a minimum transportable size Smn (e.g., business-card size), only the pair of transport rollers disposed in the middle of the takeaway roller 300 in the sheet width direction nips the sheet S. With regard to the pairs of transport rollers not nipping the sheet S, a reaction force R occurs in the nip sections, so that the nip pressure is smaller than in the case of the sheet S of the maximum size Smx, possibly causing the transport orientation to become unstable.

The automatic sheet feeder 22 as a sheet transport device according to this exemplary embodiment has the takeaway roller 250 including the first pair of transport rollers 250A and the second pairs of transport rollers 250B serving as multiple pairs of transport rollers arranged in the sheet width direction, and releases the nip of the pairs of transport rollers outside the transport region of the sheet S based on the size of the transported sheet S.

In detail, if the size of the sheet S detected by the sheet-width detection sensor SNRT, the first sheet-length detection sensor SNR2, and the second sheet-length detection sensor SNR3 is smaller than a predetermined size, the nip of the second pairs of transport rollers 250B is released.

FIG. 7A is a simplified diagram illustrating how a sheet S of the maximum size Smx (e.g., size A3) is transported. If the size of the sheet S detected by the sheet-width detection sensor SNR1, the first sheet-length detection sensor SNR2, and the second sheet-length detection sensor SNR3 is larger than the minimum size Smn, the second driven rollers 252B are located at the transport position where they nip the sheet S together with the driving rollers 251, so that the sheet S of the maximum size Smx is transported by the first pair of transport rollers 250A and the second pairs of transport rollers 250B.

FIG. 7B is a simplified diagram illustrating how a sheet S of the minimum size Smn (e.g., business-card size) is transported. If the size of the sheet S detected by the sheet-width detection sensor SNR1, the first sheet-length detection sensor SNR2, and the second sheet-length detection sensor SNR3 is smaller than the predetermined size, the second driven rollers 252B move to the separated position so as to be separated from the driving rollers 251, whereby the nip of the second pairs of transport rollers 250B is released.

In this state, the sheet S of the minimum size Smn is transported by the first pair of transport rollers 250A in the middle in the sheet width direction. Accordingly, the nip pressure applied to the sheet S is higher than in the state where the sheet S is nipped by the second pairs of transport rollers 250B, so that the transport orientation of the sheet S may be stabilized.

As shown in FIG. 6B, in the second pairs of transport rollers 250B, the second driven rollers 252B rotate by a predetermined angle downstream in the sheet transport direction, so that the sheet S transported from the feed roller 222 may be prevented from coming into contact with the second driven rollers 252B located at the separated position.

Modifications

Figure 8:
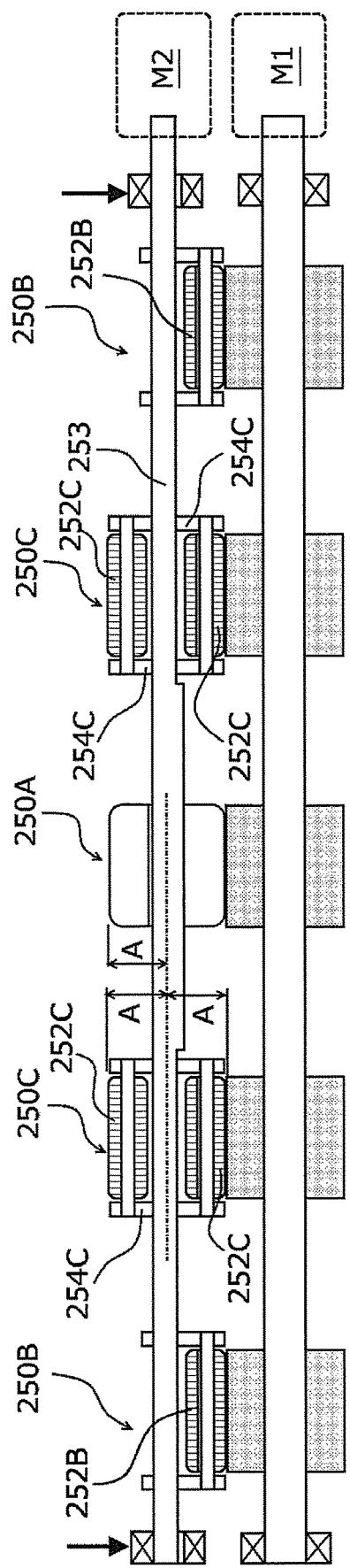
FIG. 8 is a cross-sectional view schematically illustrating the configuration of a takeaway roller according to a modification in the sheet width direction.
Figure 9:
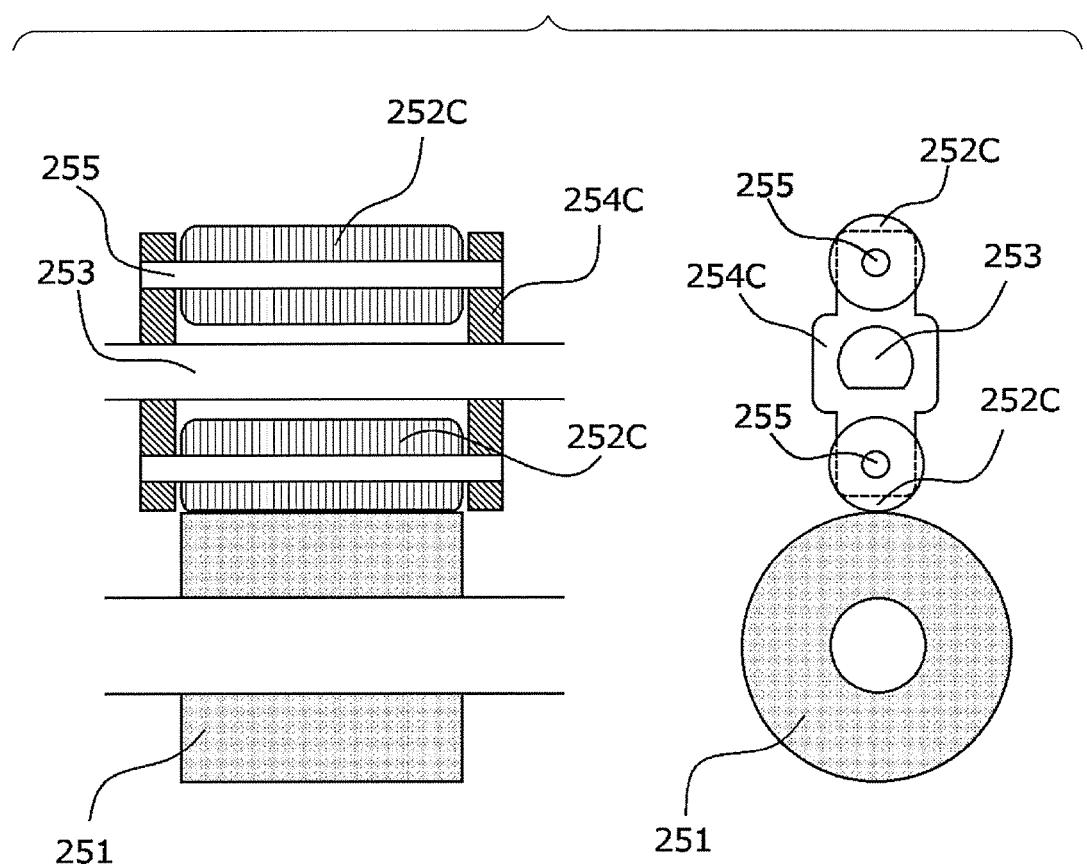
FIG. 9 is a cross-sectional view schematically illustrating a second pair of transport rollers in which second driven rollers according to the modification are located at the transport position.
Figure 10A:
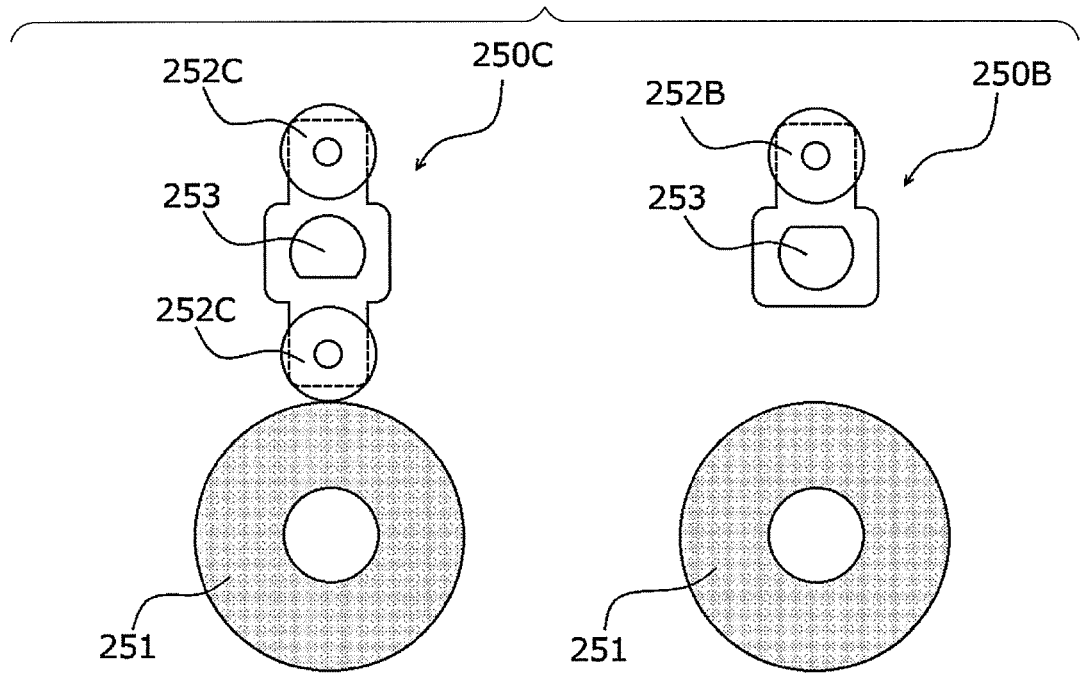
FIGS. 10A and 10B are cross-sectional views schematically illustrating the second pair of transport rollers in the nipping position.
Figure 10B:
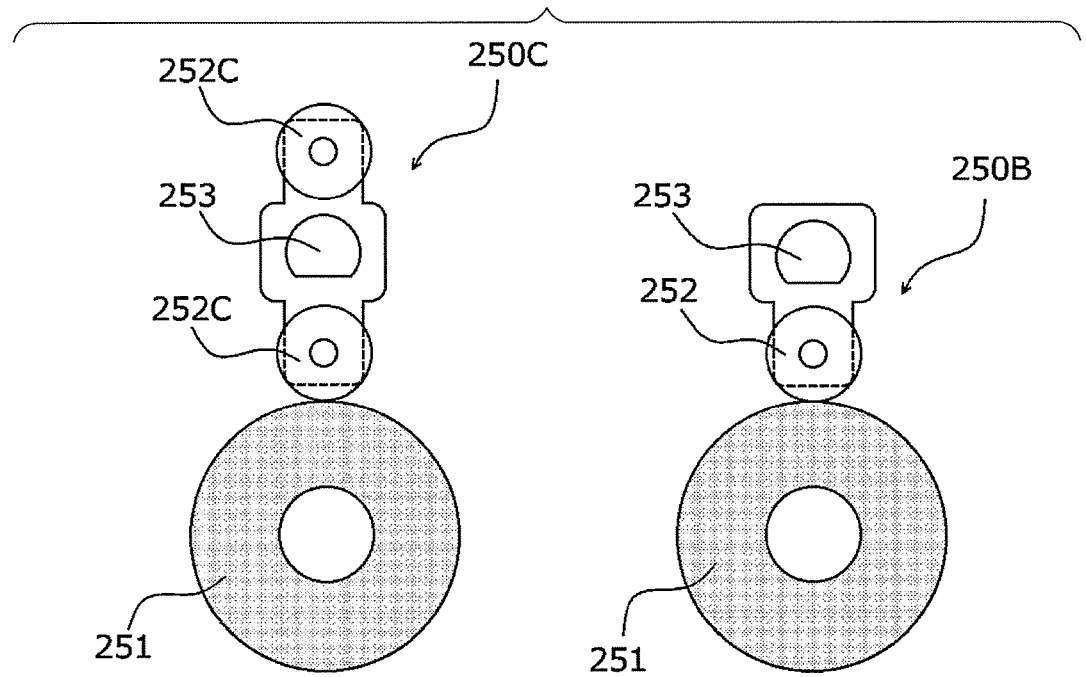

FIG. 8 is a cross-sectional view schematically illustrating the configuration of a takeaway roller 250 according to a modification in the sheet width direction. FIG. 9 is a cross-sectional view schematically illustrating a second pair of transport rollers 250C in which second driven rollers 252C according to the modification are located at the transport position. FIGS. 10A and 10B are cross-sectional views schematically illustrating the second pairs of transport rollers 250B and 250C in the nipping position. FIG. 11 is a flowchart illustrating the flow of a sheet transport process of the takeaway roller 250 according to the modification.

As shown in FIGS. 8 and 9, in the takeaway roller 250 according to the modification, the second pairs of transport rollers 250C adjacent to the first pair of transport rollers 250A in the sheet width direction each have two second driven rollers 252C that face each other from 180° positions with a support shaft 253 as the center.

The second driven rollers 252C are rotatably supported by corresponding shafts 255 at opposite ends of arms 254C whose mid sections are fixed to the support shaft 253 and that extend in 180° directions, such that the distance A (see reference sign A in FIG. 8) from the center of the support shaft 253 to the outer surface of each second driven roller 252C is uniform.

Each second driven roller 252C having such a configuration forms a nip with the corresponding driving roller 251 every time the support shaft 253 rotates by 180°. Since each of the outermost second driven rollers 252B in the sheet width direction is rotatably supported by the corresponding shaft 255 at second ends of the corresponding arms 254 whose first ends are fixed to the support shaft 253, the second driven roller 252B forms a nip with the corresponding driving roller 251 every time the support shaft 253 rotates by 360°.

Therefore, when the support shaft 253 rotates by 180°, the driving rollers 251 and the second driven rollers 252C of the second pairs of transport rollers 250C adjacent to the first pair of transport rollers 250A disposed in the middle in the sheet width direction form a nip, whereas the outermost second driven rollers 252B are set in the separated position (see FIG. 10A). When the support shaft 253 is further rotated by 180°, the second pairs of transport rollers 250C adjacent to the first pair of transport rollers 250A form a nip again with the corresponding driving rollers 251, and the outermost second driven rollers 252B form a nip with the corresponding driving rollers 251 (see FIG. 10B).

The flowchart in FIG. 11 illustrates the operation of the takeaway roller 250 according to the modification having the above-described configuration.

When the size of a sheet placed on the sheet tray 212 is detected in step S101, a sheet size SZ is determined in step S102. If the detected sheet size SZ is the maximum size Smx (e.g., size A3) (A in step S102), the first pair of transport rollers 250A and the second pairs of transport rollers 250B and 250C of the takeaway roller 250 transport the sheet while nipping the sheet in step S105.

If the detected sheet size SZ is larger than the minimum size Smn (e.g., business-card size) but smaller than the maximum size Smx (e.g., size A3) (B in step S102), the process proceeds to step S103 where the first pair of transport rollers 250A and the second pairs of transport rollers 250C of the takeaway roller 250 are set in the nipping position, whereas the outermost second driven rollers 252B are set in the separated position. In this case, when the support shaft 253 is rotated by 180°, the driving rollers 251 and the second driven rollers 252C of the second pairs of transport rollers 250C adjacent to the first pair of transport rollers 250A disposed in the middle in the sheet width direction form a nip, whereas the outermost second driven rollers 252B are set in the separated position. Then, the sheet is transported in step S105. Accordingly, a decrease in the transporting force of a small-size sheet to be transported, which has a size larger than the minimum size Smn, may be suppressed, so that the transport orientation of the sheet may be stabilized.

If the detected sheet size SZ is the minimum size Smn (e.g., business-card size) (C in step S102), the nip of the second pairs of transport rollers 250B and 250C other than the first pair of transport rollers 250A of the takeaway roller 250 is released in step S104. In this case, the support shaft 253 is rotated clockwise by a predetermined angle, so that the second driven rollers 252C adjacent to the first pair of transport rollers 250A that are disposed in the middle in the sheet width direction and that are constantly in the nipping position and the outermost second driven rollers 252B are set in the separated position. Then, the sheet is transported in step S105. Accordingly, a decrease in the transporting force of a small-size sheet to be transported may be suppressed, so that the transport orientation of the sheet may be stabilized.

Alternatively, the sheet size SZ may be designated directly by the user via the operational information unit 4.

In this exemplary embodiment, the takeaway roller 250 disposed downstream of the feed roller 222 in the transport direction of the sheet S is described as an example of a transport unit. Alternatively, the transport unit may include the pre-registration roller 260 that is disposed downstream of the takeaway roller 250 and that forms a loop in the sheet S by causing the leading edge of the sheet S to abut on the registration roller 270 in a stopped state, and the registration roller 270 that is disposed downstream of the pre-registration roller 260 and that adjusts the transport timing of the sheet S.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet transport device comprising:
a sheet transport unit that transports a sheet by nipping the sheet in a nip between a plurality of pairs of transport rollers arranged in a sheet width direction intersecting a sheet transport direction;
a detector that detects a size of the transported sheet; and
a releasing unit that releases the nip of one or more of the pairs of transport rollers outside a transport region of the sheet based on the size of the sheet detected by the detector.

2. The sheet transport device according to claim 1,
wherein the pairs of transport rollers include a first pair of transport rollers disposed in a middle in the sheet width direction and a plurality of second pairs of transport rollers disposed at opposite sides of the first pair of transport rollers in the sheet width direction, the first pair of transport rollers including a driving roller and a first driven roller, the plurality of second pairs of transport rollers each including a driving roller and a second driven roller, and
wherein if the size of the sheet detected by the detector is smaller than a predetermined size, the releasing unit releases the nip of the second pairs of transport rollers.

3. The sheet transport device according to claim 2,
wherein each second driven roller is supported in a movable manner between a transport position and a separated position with a shaft as a center, the shaft rotatably supporting the first driven roller, the transport position being where the second driven roller forms the nip with the driving roller, the separated position being where the second driven roller is separated from the driving roller, and
wherein if the size of the sheet detected by the detector is smaller than the predetermined size, the releasing unit causes the second driven rollers to move to the separated position.

4. The sheet transport device according to claim 3,
wherein the second driven rollers move to the separated position by rotating downstream in the sheet transport direction.

5. The sheet transport device according to claim 3,
wherein an outermost second driven roller of the second driven rollers in the sheet width direction forms the nip with the driving roller every time the outermost second driven roller rotates by 360° from the transport position about the shaft that rotatably supports the first driven roller.

6. The sheet transport device according to claim 4,
wherein an outermost second driven roller of the second driven rollers in the sheet width direction forms the nip with the driving roller every time the outermost second driven roller rotates by 360° from the transport position about the shaft that rotatably supports the first driven roller.

7. The sheet transport device according to claim 3,
wherein at least one of the second driven rollers adjacent to the first driven roller in the sheet width direction forms the nip with the driving roller every time the at least one second driven roller rotates by 180° from the transport position about the shaft that rotatably supports the first driven roller.

8. The sheet transport device according to claim 4,
wherein at least one of the second driven rollers adjacent to the first driven roller in the sheet width direction forms the nip with the driving roller every time the at least one second driven roller rotates by 180° from the transport position about the shaft that rotatably supports the first driven roller.

9. An image reading device comprising:

an imaging unit that reads an image of a sheet; and the sheet transport device according to claim 1 that transports the sheet to a read position where the imaging unit reads the sheet.

10. An image forming apparatus comprising:

the image reading device according to claim 9 that reads an image of a sheet; and an image recorder that records the image read by the image reading device onto a recording medium.

\* \* \* \* \*